(12) United States Patent
Donald et al.

(10) Patent No.: US 7,620,407 B1
(45) Date of Patent: Nov. 17, 2009

(54) HANDHELD THREADING

(75) Inventors: Richard J. Donald, San Jose, CA (US);
David L. Williams, Belmont, CA (US);
David Matiskella, San Francisco, CA (US); Isabel Ge Mahe, Los Altos, CA (US)

(73) Assignee: Palm, Inc., Sunnyvale, CA (US)

( * ) Notice: Subject to any disclaimer, the term of this patent is extended or adjusted under 35 U.S.C. 154(b) by 791 days.

(21) Appl. No.: 10/759,597

(22) Filed: Jan. 15, 2004

Related U.S. Application Data

(60) Provisional application No. 60/455,178, filed on Mar. 16, 2003, provisional application No. 60/479,392, filed on Jun. 17, 2003.

(51) Int. Cl.
*H04W 4/00* (2006.01)
*G06F 15/16* (2006.01)

(52) U.S. Cl. ...................... 455/466; 709/206

(58) Field of Classification Search ............... 455/466, 455/422.1; 379/265.02, 265.01, 93.24, 100.08, 379/265.09; 709/206; 358/402
See application file for complete search history.

(56) References Cited

U.S. PATENT DOCUMENTS

| | | | |
|---|---|---|---|
| 4,279,021 A | 7/1981 | See et al. | |
| 4,415,065 A | 11/1983 | Sandstedt | |
| 4,587,630 A | 5/1986 | Straton et al. | |
| 4,725,694 A | 2/1988 | Auer et al. | |
| 4,764,770 A | 8/1988 | Church | |
| 4,887,212 A | 12/1989 | Zamora et al. | |
| 4,892,981 A | 1/1990 | Soloway et al. | |
| 4,916,441 A | 4/1990 | Gombrich | |
| 5,010,547 A | 4/1991 | Johnson et al. | |
| D320,598 S | 10/1991 | Auerbach et al. | |
| 5,067,164 A | 11/1991 | Denker et al. | |
| 5,101,439 A | 3/1992 | Kiang | |
| 5,218,188 A | 6/1993 | Hanson | |

(Continued)

FOREIGN PATENT DOCUMENTS

| | | |
|---|---|---|
| EP | 0149762 A1 | 7/1986 |
| EP | 1104151 A2 | 5/2001 |

OTHER PUBLICATIONS

*American Programmer*, N. Y., American Programmer, Inc. (Dec. 1991), pp. 4-33.

(Continued)

*Primary Examiner*—George Eng
*Assistant Examiner*—Christopher M Brandt
(74) *Attorney, Agent, or Firm*—Fenwick & West LLP

(57) ABSTRACT

The present invention determines which messages to display in message threads to a user. An electronic communication device receives and stores numerous SMS messages transported through an SMS network, but the SMS messages are sent without explicit linking information such as a previous message or subject line. A threading module applies threading rules to determine which messages to correlate into an SMS message thread through implicit link information. The threading rules thread outgoing messages sent in response to an incoming message from a user, or incoming messages where a previous outgoing message was sent to the user. An SMS application displays threads in a user interface and indicates messages threads with an icon in one view, and displays an expanded message thread in another view.

76 Claims, 14 Drawing Sheets

U.S. PATENT DOCUMENTS

| | | |
|---|---|---|
| 5,227,614 A | 7/1993 | Danielson et al. |
| 5,334,824 A | 8/1994 | Martinez |
| 5,335,276 A | 8/1994 | Thompson et al. |
| 5,336,001 A | 8/1994 | Lichtenberg |
| 5,345,615 A | 9/1994 | Garofalo |
| 5,357,065 A | 10/1994 | Mitamura et al. |
| 5,359,317 A | 10/1994 | Gomez et al. |
| 5,379,057 A | 1/1995 | Clough et al. |
| 5,392,447 A | 2/1995 | Schlack et al. |
| D359,920 S | 7/1995 | Sakamoto |
| 5,430,436 A | 7/1995 | Fennell |
| 5,465,401 A | 11/1995 | Thompson |
| 5,494,363 A | 2/1996 | Hochgesang |
| 5,503,484 A | 4/1996 | Louis |
| 5,650,776 A | 7/1997 | Mitchell et al. |
| 5,705,995 A | 1/1998 | Laflin et al. |
| 5,742,894 A | 4/1998 | Jambhekar et al. |
| 5,779,030 A | 7/1998 | Ikegami et al. |
| 5,812,651 A | 9/1998 | Kaplan |
| 5,813,778 A | 9/1998 | Shih |
| 5,903,852 A | 5/1999 | Schaupp, Jr. et al. |
| 5,905,863 A * | 5/1999 | Knowles et al. ............. 709/206 |
| 5,917,906 A | 6/1999 | Thomton |
| 5,936,614 A | 8/1999 | An et al. |
| 5,941,648 A | 8/1999 | Robinson et al. |
| 5,966,652 A | 10/1999 | Coad et al. |
| D416,256 S | 11/1999 | Griffin et al. |
| 6,038,547 A | 3/2000 | Casto |
| 6,058,304 A | 5/2000 | Callaghan et al. |
| 6,101,531 A | 8/2000 | Eggleston et al. |
| 6,151,507 A * | 11/2000 | Laiho et al. ................. 455/466 |
| 6,157,630 A | 12/2000 | Adler et al. |
| 6,166,342 A | 12/2000 | Chou |
| 6,198,053 B1 | 3/2001 | Chou |
| 6,226,362 B1 | 5/2001 | Gerszberg et al. |
| 6,230,197 B1 * | 5/2001 | Beck et al. .................. 709/223 |
| 6,256,631 B1 | 7/2001 | Malcolm |
| 6,259,931 B1 | 7/2001 | Singh |
| 6,278,442 B1 | 8/2001 | Griffin et al. |
| 6,289,226 B1 | 9/2001 | Lekven et al. |
| 6,295,372 B1 | 9/2001 | Hawkins et al. |
| 6,310,609 B1 | 10/2001 | Morgenthaler |
| 6,333,973 B1 * | 12/2001 | Smith et al. ............. 379/88.12 |
| 6,346,952 B1 * | 2/2002 | Shtivelman ................. 715/758 |
| D454,349 S | 3/2002 | Makidera et al. |
| 6,363,349 B1 | 3/2002 | Urs et al. |
| 6,370,018 B1 | 4/2002 | Miller et al. |
| D456,794 S | 5/2002 | Laverick et al. |
| 6,396,482 B1 | 5/2002 | Griffin et al. |
| 6,415,138 B2 | 7/2002 | Sirola et al. |
| D462,354 S | 9/2002 | Kimbre et al. |
| 6,452,588 B2 | 9/2002 | Griffin et al. |
| D464,962 S | 10/2002 | MacGregor et al. |
| 6,489,950 B1 | 12/2002 | Griffin et al. |
| D468,714 S | 1/2003 | Maruska et al. |
| D469,749 S | 2/2003 | Kim |
| D470,842 S | 2/2003 | Bhatia et al. |
| 6,516,202 B1 | 2/2003 | Hawkins et al. |
| D471,559 S | 3/2003 | DeSaulles |
| D477,597 S | 7/2003 | Laverick et al. |
| 6,611,254 B1 | 8/2003 | Griffin et al. |
| 6,611,255 B2 | 8/2003 | Griffin et al. |
| 6,630,944 B1 * | 10/2003 | Kakuta et al. ............... 715/758 |
| 6,690,931 B2 | 2/2004 | Heo |
| D488,478 S | 4/2004 | Laverick et al. |
| 6,799,033 B2 * | 9/2004 | Kanefsky ................. 455/412.1 |
| 6,867,763 B2 | 3/2005 | Griffin et al. |
| 6,870,828 B1 | 3/2005 | Giordano, III |
| 6,873,317 B1 | 3/2005 | Griffin et al. |
| 6,891,529 B2 | 5/2005 | Ladouceur et al. |
| 6,919,879 B2 | 7/2005 | Griffin et al. |
| 6,938,067 B2 | 8/2005 | Hershenson |
| 6,941,134 B2 * | 9/2005 | White ........................ 455/418 |
| 6,981,223 B2 | 12/2005 | Becker et al. |
| 7,003,305 B2 | 2/2006 | Urs |
| 7,007,239 B1 | 2/2006 | Hawkins et al. |
| D518,820 S | 4/2006 | Hawkins et al. |
| D518,825 S | 4/2006 | Hawkins et al. |
| D519,502 S | 4/2006 | Hawkins et al. |
| 7,028,263 B2 * | 4/2006 | Maguire ..................... 715/758 |
| 7,054,441 B2 | 5/2006 | Pletikosa |
| 7,061,403 B2 | 6/2006 | Fux |
| 7,103,010 B2 | 9/2006 | Melideo |
| 7,103,348 B1 | 9/2006 | Levit et al. |
| 7,103,388 B2 | 9/2006 | Scott |
| 7,266,584 B2 * | 9/2007 | Mullen et al. ............... 709/206 |
| 2001/0006889 A1 * | 7/2001 | Kraft .......................... 455/412 |
| 2001/0021649 A1 * | 9/2001 | Kinnunen et al. ........... 455/412 |
| 2001/0025309 A1 * | 9/2001 | Beck et al. .................. 709/223 |
| 2002/0019243 A1 * | 2/2002 | Zhang et al. ................ 455/466 |
| 2002/0044136 A1 | 4/2002 | Griffin et al. |
| 2002/0069218 A1 | 6/2002 | Sull et al. |
| 2002/0115476 A1 | 8/2002 | Padawer et al. |
| 2002/0147614 A1 | 10/2002 | Doerr et al. |
| 2002/0190957 A1 | 12/2002 | Lee et al. |
| 2003/0005048 A1 | 1/2003 | Risalvato |
| 2003/0065788 A1 | 4/2003 | Salomaki |
| 2003/0114174 A1 * | 6/2003 | Walsh et al. ................ 455/466 |
| 2003/0185379 A1 * | 10/2003 | O'Connor et al. ....... 379/265.02 |
| 2004/0015548 A1 * | 1/2004 | Lee ............................ 709/204 |
| 2004/0137884 A1 * | 7/2004 | Engstrom et al. ......... 455/414.1 |
| 2004/0166829 A1 | 8/2004 | Nakae et al. |
| 2004/0185883 A1 * | 9/2004 | Rukman ..................... 455/466 |
| 2004/0218609 A1 | 11/2004 | Foster et al. |
| 2004/0233159 A1 | 11/2004 | Badarneh |
| 2004/0239639 A1 | 12/2004 | Stavely et al. |
| 2005/0097189 A1 | 5/2005 | Kashi |
| 2006/0034434 A1 | 2/2006 | Kashi |

OTHER PUBLICATIONS

*At Last, Technology Harnesse* [sic] *One of the Most Powerf* [sic] *Forces known to Man.*, Foster City, GO Corporation, 1991, 14 pages.

AT&T New Release, *NCR Cuts Price of 3170 Notebook Computer 11 to 19 Percent* [online]. (Mar. 8, 1993), Retrieved from the Internet: <URL:http://www.att.com/press/0393/930308.nca.html> 2 pages.

Carr, R.M., *The Point of the Pen*, Byte (Feb. 1991, Reprinted), 10 pages.

Cullen, A., *Connecting With Your EO Cellular Module*, Mountain View, EO, Inc., 1992, 1993, pp. ii-33.

Cullen, A., *Getting Started With Your EO Personal Communicator*, Mountain View, EO, Inc., 1992, 1993, pp. ii-74.

Cullen, A., *Lookup Guide to the EO Personal Communicator*, Mountain View, EO, Inc., 1992, 1993, pp. ii-320.

*Go Corporation Information Statement*, (Nov. 8, 1993), 114 pages.

*IBM Selects Racotek Data/Voice Communications Services to Interface With Touchmobile Product*, PR Newswire (Jan. 25, 1993), 2 pages.

*IBM TouchMobile Information and Planning Guide*, International Business Machines Incorporated (Mar. 1993), 20 pages.

*IBM TouchMobile Solution for Data Capture and Communication, Keeping Your Business Moving in the 90s*, International Business Machines Incorporated (Jan. 1993), 13 pages.

*IBM'S Touchmobile Helps Field Workers Collect Data at the Touch of a Finger*, PR Newswire (Jan. 26, 1993), 2 pages.

MacNeill, D., *Messaging Card and NewtonMail: We Pick Up and Deliver*, On The Go Magazine [online]. (Oct. 13, 1993), Retrieved from the Internet: <URL:http://www.pencomputing.com/Newton/NewtonNotes2.html>pages.

MacNeill, D., *Wireless Newton Technology Goes to Work*, On The Go Magazine [online]. (Sep. 8, 1993), Retrieved from the Internet:<URL:HTTP://www.pencomputing.com/Newton/Newton-Notes1.html>2 pages.

Maki, K., *The AT&T EO Travel Guide*, N.Y., John Wiley & Sons, Inc., 1993, pp. iii-555.

Schlender, B. R., *Hot New PCs That Read Your Writing, Fortune* (Feb. 11, 1991, Reprinted), 6 pages.

Stock, R., *The World of Messaging An Introduction to Personal Communications*, Mountain View, EO, Inc., 1992, 1993, pp. ii-69.

Nokia Introduces Mobile Chat With Nokia 3310, [online], Sep. 1, 2000, [retrieved on Nov. 17, 2003], <http://www.mobiletechnews.com/info/2000/09/01/142022.htm>.

Nokia, Frequently Asked Questions;[online], [retrieved on Nov. 17, 2003], <http://www.nokia.co.in/nokia_apac/india/faqs_list/0,18778,39_41,00.html>.

Toshiba Computer Systems Group (http://www.toshiba.com) May 28, 2002.

Toshiba Computer Systems Group: Pocket PC e570 (http://www.pda.toshiba.com) Jul. 7, 2001.

Hewlett Packard, Products and services, (http://www.hp.com/) Nov. 11, 2001.

T-Mobile Product; Handhelds (http://www.tmobile.com) Sep. 28, 2002.

T-Mobile Product; Sidekick (http://www.tmobile.com) Sep. 28, 2002.

"3GPP2 Multimedia Messaging System—MMS Specification Overview—Revision: A" [online], May 2003, Mobile Messaging, [retrieved on Dec. 10, 2004]. Retrieved from the Internet <URL:http://www.lebodic.net/left.htm.

"An Introduction to Mobile Messaging" [online], May 2003, Mobile Messaging, [retrieved on Dec. 10, 2004]. Retrieved from the Internet: <URL:http://www.lebodic.net/intro.htm.

Screen Dumps of Microsoft Internet Explorer 6.0, 2001, pp. 1-13.

Aiken et al., "Microsoft Computer Dictionary," Microsoft Press, Fifth Edition, p. 523.

* cited by examiner

| Active Thread Reference No. | Incoming or Outgoing | Identification | Timestamp | Text |
|---|---|---|---|---|
| -- | Outgoing | Richard | 03:05.32 | LOL |
| 2 | -- | (312) 555-1782 | -- | -- |
| 1 | -- | Ana | -- | -- |

FIG. 6

| Active Thread Reference No. | Incoming or Outgoing | Identification | Timestamp | Text |
|---|---|---|---|---|
| 1 | Incoming | Ana | 02:00.15 | Confirmed for the ... |
| 1 | Outgoing | Ana | 05:06.29 | See you then unless ... |
| 2 | Outgoing | (312) 555-1782 | 2:12.01 | No she didn't! |
| 2 | Outgoing | (312) 555-1782 | 12:01.00 | Yes she did! |

FIG. 7

| Source Address 810 | Destination Address 820 | SMSC Address 830 | Time Stamp 840 | Encoding Type 850 | Text Message 860 |
|---|---|---|---|---|---|

FIG. 8

HANDHELD THREADING

CROSS-REFERENCE TO RELATED APPLICATIONS

This application claims priority under 35 U.S.C. § 119(e) to U.S. Provisional Patent Application Nos. 60/455,178, filed on Mar. 16, 2003, entitled "Handheld PDA, Telephone, and Camera," and 60/479,392, filed on Jun. 17, 2003, entitled "Communicator" from both of which priority is and which applications are incorporated by reference herein in their entirety.

BACKGROUND OF THE INVENTION

1. Field of the Invention

This invention relates generally to network messaging applications and, more specifically, to correlating messages received in network messaging applications.

2. Description of Related Art

Messaging applications are the "killer apps" for networked devices. Mobile phone networks have traditionally been limited to voice communications, but new technologies such as GSM (Global System for Mobile Communications) have enabled mobile phone networks to also include data communications. For example, SMS (Short Message Service) messaging provides a software-independent protocol to send short text messages composed of either: 160-7 bit characters; 70-16 bit characters; or 140 octets of binary data. Individual SMS messages thus require a relatively small network bandwidth and devices can receive messages, even when connected to a voice call. The number of SMS messages a user receives has continually increased because many new types of network devices have joined mobile phone networks. These devices include, for example, PDAs, hybrid PDA/mobile phone devices, and other text messaging devices using GSM networks. An inherent limitation of the small SMS packet size is that neither previous messages nor subject lines are included within a current SMS message.

Because there is no inherent linking information (e.g., subject line or application session tags) in SMS messages, they are displayed as discrete interchanges without the context of related SMS messages. A user exchanging SMS messages with multiple other users can thus quickly lose track of the multiple conversations. Moreover, messages identified by phone numbers add a level of confusion. Consider a situation where User A sends a message to User B—"What time shall we meet?"—and also to User C—"How many times?" A response message of "3" identified only by the sender's phone number may leave User A wondering whether the message was from User B or from User C.

A similar problem can arise when exchanging multiple messages with a single user. Because SMS messages are held while a mobile device is not reachable, User A may not receive User B's response to a message for hours or even days. The entire conversation topic can thus span hours or days. Without the context of previous messages, User B's response may leave User A wondering what question is being answered or how the conversation started.

What is needed is a robust messaging application that solves the above constraints of mobile devices and the inherent shortcomings of their communication protocols. Furthermore, the messaging application should determine which messages to thread despite the above problems.

SUMMARY OF THE INVENTION

The present invention determines which messages to display to a user as a message thread. In one embodiment, an SMS device receives and stores numerous SMS messages transported through an SMS network. SMS messages do not contain any explicit linking or relationship between the messages. Thus the SMS device must apply threading rules to determine whether to thread SMS messages by identifying implicit links. A threading engine generates an SMS message thread by applying threading rules from the outgoing SMS message rules for outgoing messages and from the incoming SMS message rules for incoming messages. An SMS application, operating independently from the threading engine, displays SMS message threads to the user.

One embodiment of the threading engine identifies related messages from implicit links between messages from a unique identifier native to SMS data packets, such as a source or destination address. The unique identifier is independent of an SMS application, or instantiations of the SMS application. In another embodiment, the SMS application assigns an application identifier to an identified message thread. As such, the source and destination SMS applications, and instantiations of the same, are capable of further communications.

In another embodiment, the threading engine applies threading rules to correlate current messages with previous messages. The threading engine appends the current message to an active thread when available. If not, the threading engine generates an SMS thread having the previous and current messages in a hierarchy according to relationships between the messages. For example, the hierarchy may represent the order of arrival of included messages, who sent each message, and/or which messages are replies to others.

In yet another embodiment, the threading rules database is organized according to outgoing message rules and incoming message rules. In another embodiment, the threading rules database is organized by interrelated set of message inclusion rules, message hierarchy rules, message formatting rules, and thread management rules. The threading rules may be predetermined and/or dynamically updated according to user configurations.

In still another embodiment, the user interface displays an icon to indicate message threads. In another embodiment, the user interface displays an expanded message thread representing message hierarchy. In yet another embodiment, the user interface displays a drop-down menu to list active threads.

BRIEF DESCRIPTION OF THE FIGURES

FIG. 6 is a table illustrating previous SMS messages as stored in the SMS message database according to one embodiment of the present invention FIG. 7 is an active thread list containing a list of active threads according to one embodiment of the present invention.

FIG. 8 is a block diagram illustrating the SMS data packet according to one embodiment of the present invention.

DETAILED DESCRIPTIONS OF THE PREFERRED EMBODIMENTS

The present invention determines which messages to display in a message thread to a user. A "thread," as used herein, refers to a set of correlated messages. The threads are displayed to show current incoming or outgoing messages and their relationship to previous messages.

It will be understood by one of ordinary skill in the art that although the described embodiment uses an SMS messaging, the invention may also be applied to MMS (Multimedia Messaging Service), EMS (Enhanced Messaging Service), or any data protocol capable of encapsulating messages for transport between networked devices. Also, the terms "SMS messages" and "messages" are used interchangeably herein. Additionally, the terms "outgoing" and "sent" messages are used interchangeably herein, as are the terms "incoming" and "received."

Figure 1:
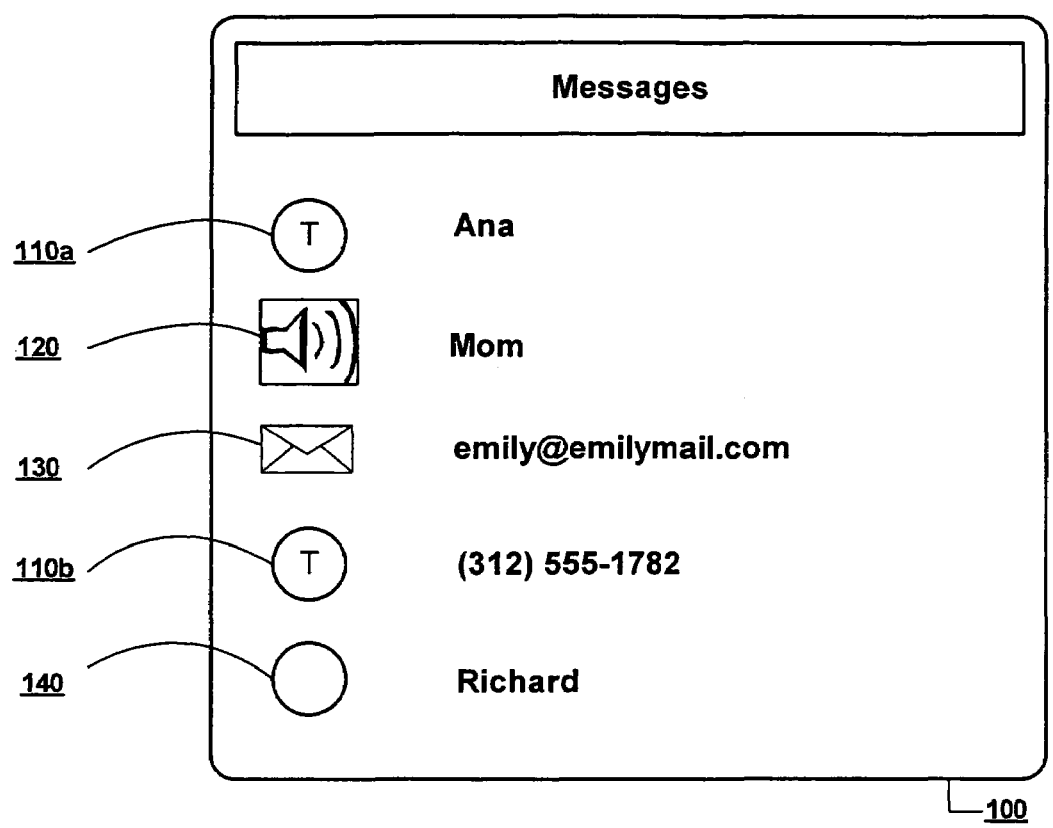
FIG. 1 illustrates a user interface of an electronic communication device that includes SMS thread icons according to one embodiment of the present invention.
Figure 3:
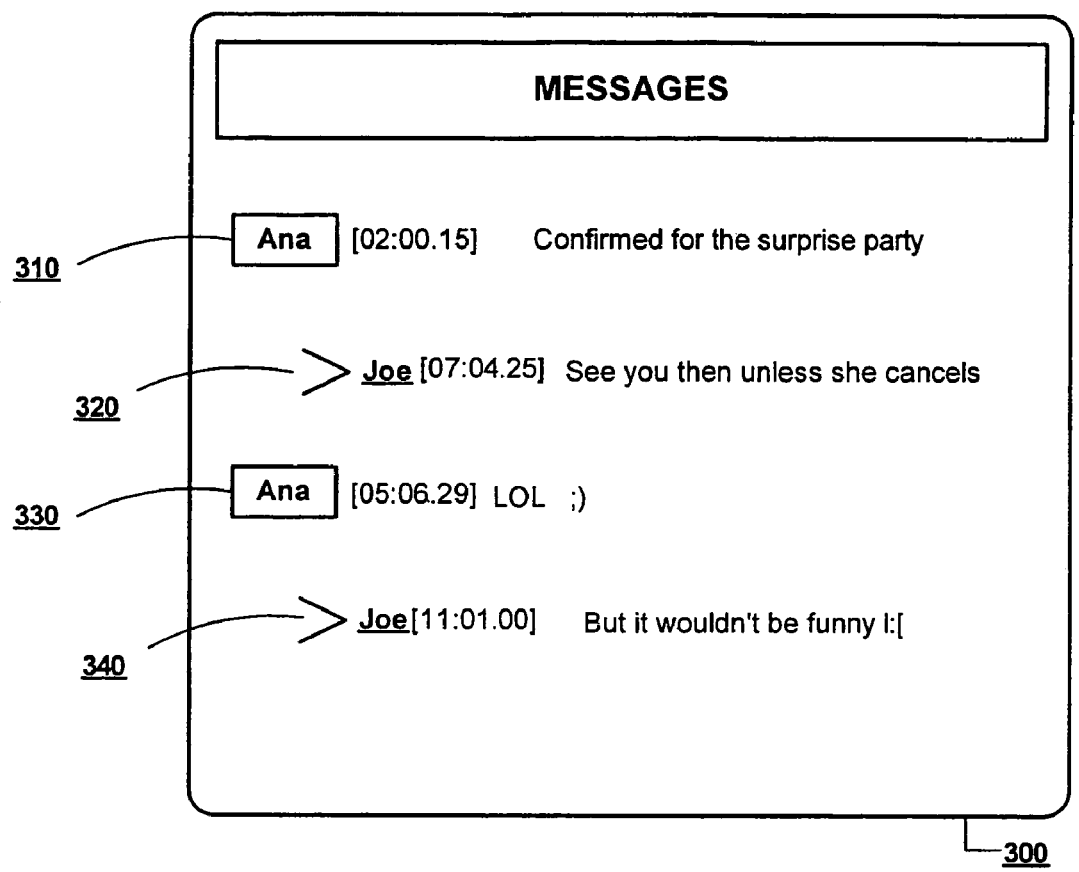
FIG. 3 illustrates a user interface including an expanded SMS thread according to one embodiment of the present invention

FIG. 1 illustrates a user interface 100 of an electronic communication device that includes SMS thread icons according to one embodiment of the present invention. The user interface 100 comprises a listing of various types of messages as indicated by accompanying icons including threaded SMS messages icons 110a,b, a voicemail message icon 120, an e-mail icon 130, and a non-threaded SMS message icon 140. To the user, the threaded SMS messages icon 110 indicates an exchange of messages with Ana and a user of phone number (312)555-1782 in contrast to the non-threaded SMS message icon 140 which is indicative of a discrete message. A user selects the threaded SMS message icon 110 to view an expanded message thread as shown in FIG. 3. Further, the threaded SMS messages icon 1210 is indicative of a message in SMS format whereas the voicemail icon 1220 and e-mail icon 1230 are indicate of messages in voicemail and e-mail respectively. In one embodiment, additional types of threaded message icons are associated with the individual messages to indicate elements within the message such as an Internet photo link. In another embodiment, the user interface 100 is dedicated to SMS message thread icons 110a,b, 140. The user interface 905 is presented to a user through an LCD, plasma, CRT, or any other display device as described further below.

Figure 2:
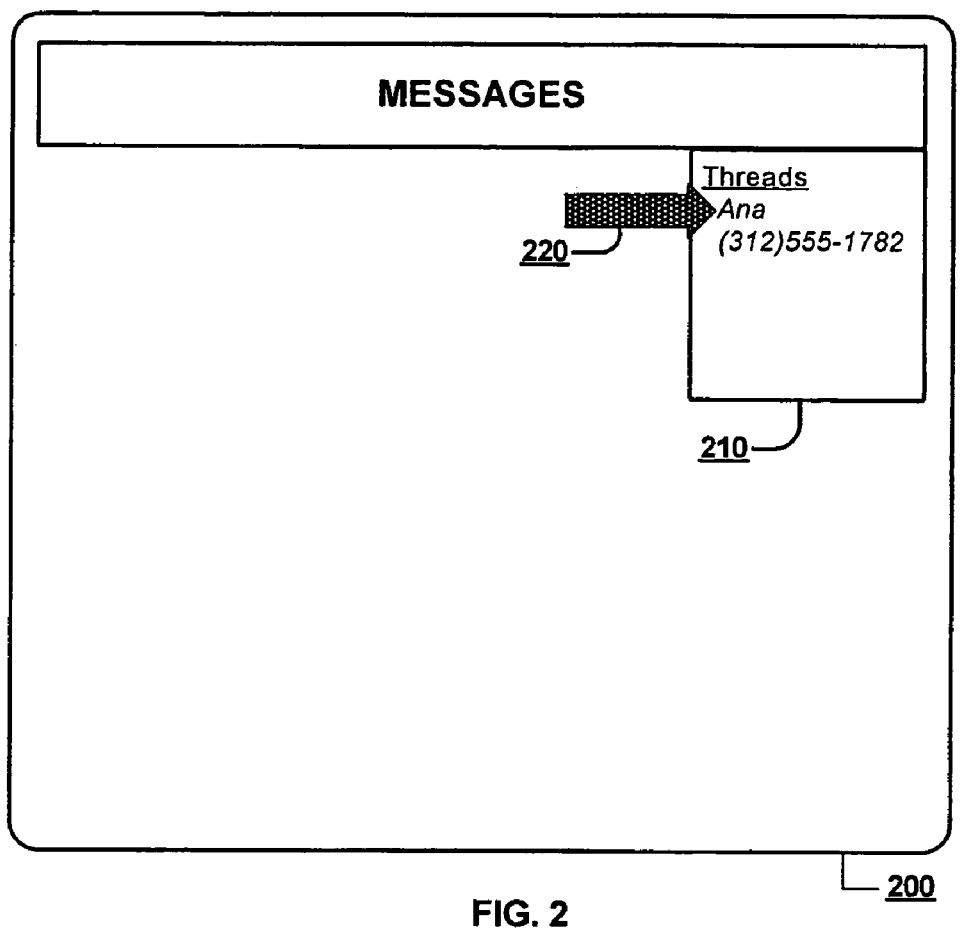
FIG. 2 is an illustration of a drop-down menu of active message threads in a user interface according to one embodiment of the present invention

FIG. 2 is an illustration of a drop-down menu 210 of active message threads in the user interface according to one embodiment of the present invention. The drop-down menu 210 includes active thread entries corresponding to a message exchange for contacts Ana and the user of phone number (312) 555-1782 as discussed above and below. The user positions cursor 220 to select and display the expanded message thread with Ana. A list of active threads as stored in memory is shown in FIG. 7.

FIG. 3 illustrates the user interface 300 including an expanded SMS thread according to one embodiment of the present invention. The expanded thread includes discrete messages 310-340. Each message includes an originator, a time stamp and a text message. The messages are organized in chronological order (i.e., message 310 sent at 02:00.15 is listed before message 320 sent at 05:06.29, etc.). The outgoing messages comprise a square icon labeled "Ana" as distinguished from the incoming messages, which comprise an arrow and underline labeled "Joe." It will be understood that various methods are used to distinguish incoming and outgoing messages.

Figure 4:
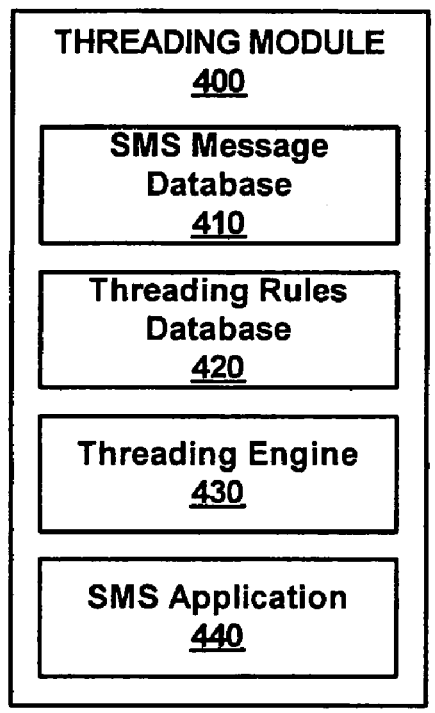
FIG. 4 is a block diagram illustrating the threading module according to one embodiment of the present invention.
Figure 15A:
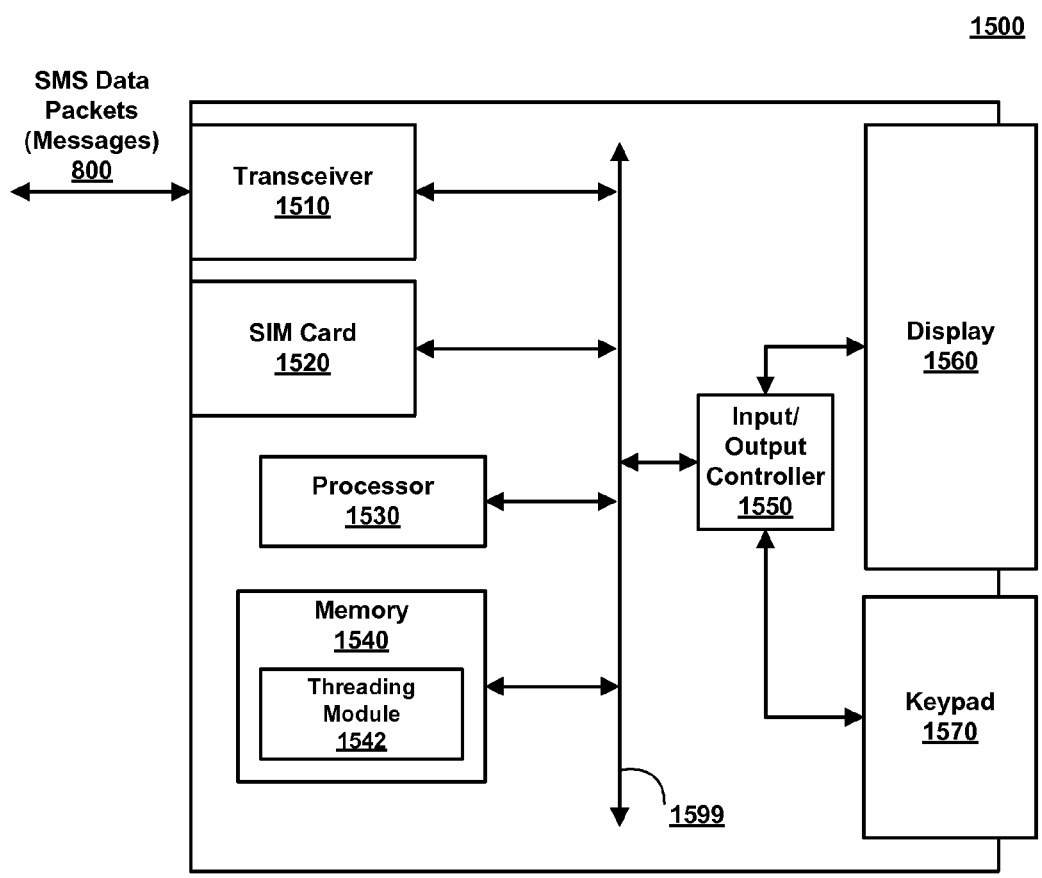
FIG. 15A is a block diagram illustrating an example electronic communication device according to one embodiment of the present invention.
Figure 16:
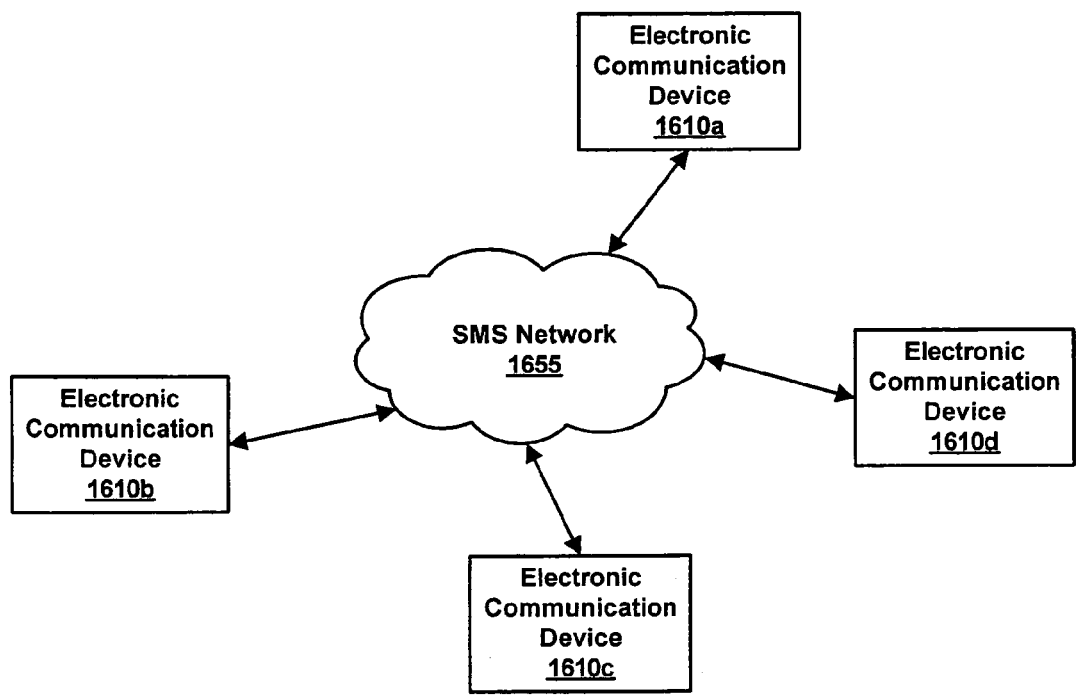
FIG. 16 is a block diagram illustrating an example system for transmitting SMS messages.

FIG. 4 is a block diagram illustrating the threading module 400 according to one embodiment of the present invention. The threading module 400 to determines which current and previous messages to correlate into threads for display to the user. The threading module 400 of FIG. 4 comprises an SMS message database 410, a threading engine 430, a threading rules database, and an SMS application 440. An operating system such as Palm OS 5 by Palm, Inc., Windows CE or Windows XP by Microsoft, or any other message passing operating system facilitates interoperability between hardware and software, and inter-process communication in the threading module 400. In one embodiment the threading module 400 is implemented in software executed in hardware as shown in FIG. 15A. Other embodiments implement the threading module in hardware or firmware. Additionally, the threading module 400 is coupled to receive SMS messages from an SMS network as shown in FIG. 16.

The SMS message database 410 persistently stores incoming and outgoing SMS messages. Incoming messages are received from other SMS devices. Outgoing messages are entered into the electronic communication device by the user. The SMS message database 410 stores messages until a corresponding memory is full, a maximum number of messages has been reached, a time period has passed, or the like. If the SMS device is powered down, and then powered up again, the messages are still available for correlating into threads. By contrast, prior art systems without persistent memory are not able to recover message threads after powering down, resetting, or the like. In one embodiment, unthreaded messages are stored in format as shown in FIG. 7, and threaded messages are stored in a format as shown in FIG. 8.

Figure 5:
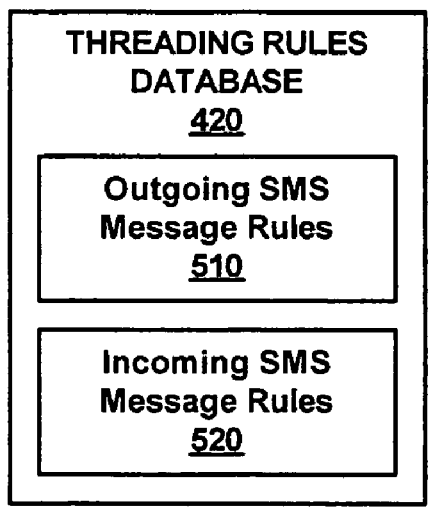
FIG. 5 is a block diagram illustrating the threading rules database according to one embodiment of the present invention.

The threading rules database 420 stores rules that characterize relationships between incoming and outgoing messages stored in the SMS message database 410. FIG. 5 is a block diagram illustrating a threading rules database according to one embodiment of the present invention. The threading rules database 420 comprises outgoing SMS message rules 510 and incoming SMS message rules 520. In one embodiment, the incoming SMS message rules 510 prevent unnecessary or unsolicited threads.

The outgoing SMS message rules 510 are applied to messages sent from the electronic communication device to determine its relationship to previous messages. Example categories of threading rules include rules that determine: thread association; the type of thread in which to include the message; previous messages to include in the thread; and thread hierarchy. One rule always threads outgoing messages sent in reply to incoming messages. Another rule only thread outgoing messages sent to devices listed in the phone book. Yet another ensures that messages older than, for example, an hour or a week, are not threaded. Also, if the last message is older than a predetermined time, a new messages are included in a new thread.

The incoming SMS message rules 520 are applied to messages received to the electronic communication device to determine its relationship to previous messages. For example, one rule limits unsolicited threads by only threading incoming messages from known users, or that are verified by the device user. A similar rule does not thread messages that originate from known spammers or commercial entities. Other do not thread rules relate to special addresses that, although are from a common source, are not desirable for threading. For example, rules detect and exclude voicemail notifications and numerical pages from a database of special addresses. Another rule attempts to thread incoming messages sent in reply to outgoing messages by assuming that any incoming message received from the destination of an outgoing message within a time limit, such as 15 minutes, is a reply. It will be understood by one of ordinary skill in the art that the outgoing and incoming threading rules 510, 520 are provided solely for the purpose of illustration and that other rules may also be included without departing from the spirit of the invention.

In FIG. 4, the threading engine 430 applies threading rules to correlate the current and previous messages into threads. In response to receiving incoming or outgoing messages, or indications of such, from the operating system, the threading engine 430 associates the current message with previous messages of the same thread. The threading engine 430 identifies the messages based on a unique identifier native to SMS packets containing the SMS message. One example of a unique identifier is the source or destination address. A thread is organized by the unique identifier, a sender's or receiver's name, a contact from a phone book, a phone number, SMS address, group affiliation, a business entity, a subject matter category, a device, a location, a message urgency, or otherwise. The threading engine 430 may find an appropriate active thread, and add the message into that thread. In another embodiment, the threading engine 430 generates a thread on-the-fly by sorting or previous messages in the SMS message database 410 to find messages of similar characteristics. The messages are then put in chronological order. In yet another embodiment, if there are no active threads or previous messages that correlate to the current message, the threading engine 430 initializes a new SMS thread. Methods related to the threading engine 430 are described in more detail below.

The SMS application 440 displays threads in a user interface and receives messages input by a user. The SMS application 440 displays a SMS messages thread icon responsive to receiving an indication that the message belongs to a thread as shown in FIG. 1. In response to selecting the threaded message icon 110 or active thread 220 from the drop down menu, the SMS application 440 displays an expanded thread as shown in FIG. 3.

The SMS application 440 may perform additional analysis on the message thread. In one embodiment, the SMS application 440 initiates a ring-tone when receiving an incoming message included in an SMS thread. In another embodiment, the SMS application 440 determines format of the message text. In yet another embodiment, the SMS application 440 receives display formats from the threading engine 430. For example, the threading engine 430 indicates separate display formats for incoming and outgoing messages, outgoing messages in progress, or otherwise.

The SMS application 440 is, for example, a network browser to view remotely stored SMS threads, an application dedicated to SMS threading, or any other messaging application that configured to send and/or receive messages (SMS and/or other types of messages) according to the present invention. In one embodiment a sending SMS application 440 is different from a receiving SMS application 440. The threading engine 430 thus threads messages independently and outputs its results through an application programming interface. Methods related to the SMS application 440 are described in more detail below.

FIG. 6 is a table 600 illustrating previous SMS messages as stored in the SMS message database according to one embodiment of the present invention. The SMS message database 410 receives information from SMS protocol packets and stores the information in the SMS message table 600. It will be understood that SMS messages can be stored in any appropriate database or data structure. The format of FIG. 6 is provided as an example format. For each stored message, the SMS message database 600 indicates: a reference number for an active thread; whether the message is incoming or outgoing; an identification of who an outgoing message is sent to or who an incoming message is received from; a timestamp; and the message text. In one embodiment, a subset of the SMS message database 410 including a list of active threads is stored separately for fast processing.

FIG. 7 is an active thread list 700 containing a list of active threads according to one embodiment of the present invention. The active thread list 700 is a list of users, etc. with whom the user is currently engaged in a threaded conversation as shown in FIG. 2, and corresponding message reference numbers or pointers to messages in the SMS message database. The active thread list 700 receives an indication and is updated when a new thread is initialized or generated on-the-fly. The active thread list 700 also receives pointer updates. In one embodiment, the active thread list 700 comprises the SMS message table 600 with a column to indicate a thread flag.

FIG. 8 is a block diagram illustrating an SMS data packet 800 according to one embodiment of the present invention. One of ordinary skill in the art will recognize that variations and enhancements of the SMS data packet 800, such as set forth by the ETSI (European Telecommunications Standards Institute) for GSM, are within the scope of the present invention. The SMS data packet 800 comprises a header with fields for a source address 810, a destination address 820, an SMSC (Short Message Service Center) or gateway address 840, a time stamp 830, an encoding or message type 850, and a text message or data payload 860. Accordingly, the source address 810 can indicate the sender of an incoming message and the destination address 820 can indicate the receiver of an outgoing message. The SMSC address 830 indicates the service center on the SMS network that forwards the SMS data packet 800 to its destination. The time stamp 840 indicates a time of dispatch from the SMSC or sending device. The payload indicates an encoding type for the data such as a number of bits and whether data is binary. The message text 840 contains up to 160 characters of a communication from sender to receiver, binary data representing a ring tone, or any other data suitable for an SMS data packet 800.

Figure 9:
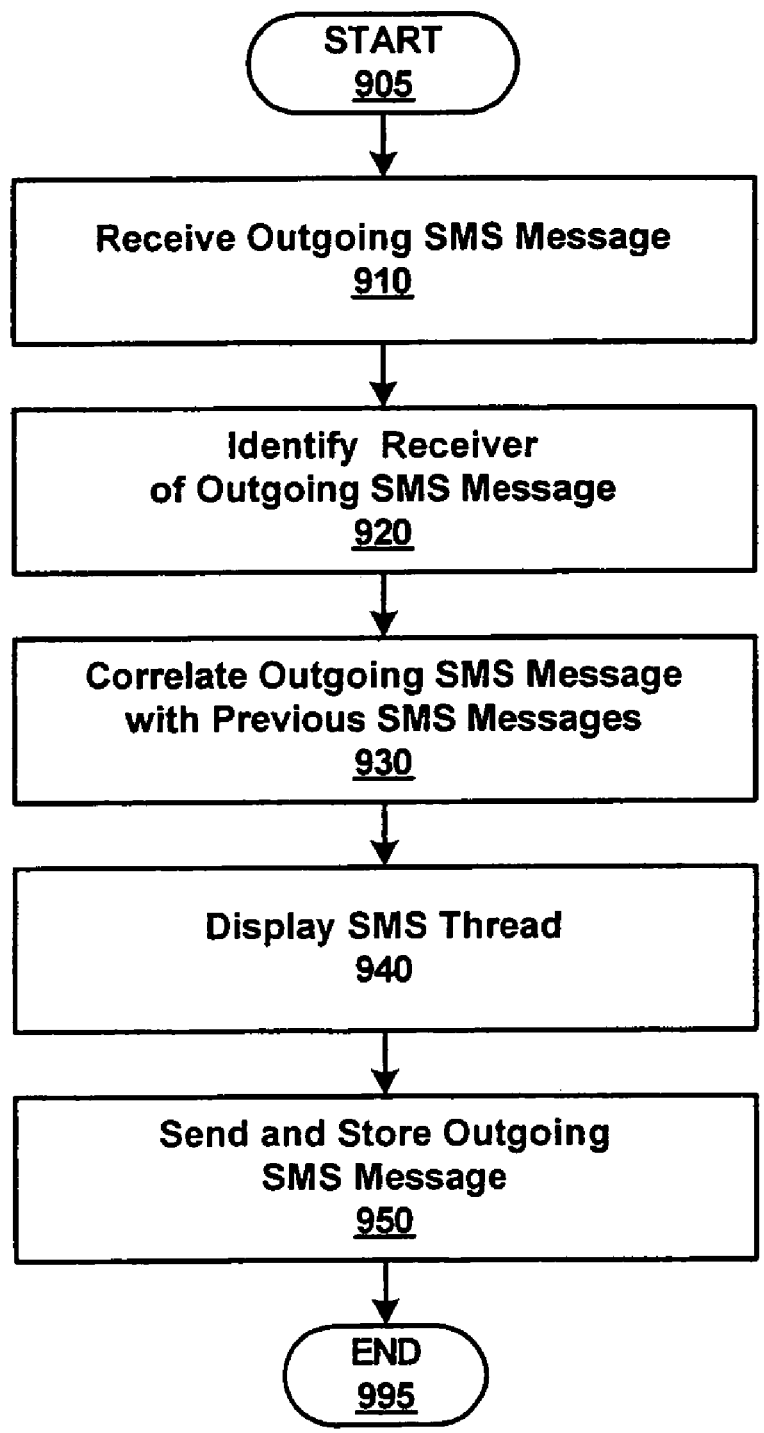
FIG. 9 is a flow chart illustrating the method of SMS threading to include an outgoing message according to one embodiment of the present invention.

FIG. 9 is a flow chart illustrating the method of SMS threading 900 to include an outgoing message according to one embodiment of the present invention. The threading module 400 initializes 905 in response to the SMS message database 410 receiving 910 outgoing SMS message, a signal from the SMS application 440, at power up, reset, or otherwise.

The threading module 400 identifies 720 the receiver of the outgoing message from, for example, a "To", "Cc", or "Bcc" field in the user interface, the SMS packet's destination address 820, or as indicated by the SMS message database 410. In one embodiment, a first identifier is the identified receiver as indicated by the receiver's name, phone number, SMS address, group affiliation, or other unique identifier. In another embodiment, a second identifier is associated with two or more first identifiers. One example of a second identifier is a phone book contact with two phone numbers, each phone number constituting a first identifier. Based on the specific implementation, two SMS threads can be generated based on the first and second phone numbers, or a single SMS thread can be generated based on the phone book contact.

The threading engine 930 correlates 730 the outgoing message with previous messages according to threading rules and outputs the resulting thread to the SMS application 440 as shown below in FIGS. 10-11.

The SMS application 440 displays 940 the resulting SMS thread in a user interface. In one embodiment, the SMS application 440 displays 940 the thread while the outgoing message is being entered. For instance, if a user selects a reply icon, the threading module 400 may assume that the current message will be sent to the same entity that the replied to message was received from and include that outgoing message in the same thread. In another embodiment, the SMS application 440 displays 940 threads after the message has been sent. The threading module 400 may also display 740 threads in circumstances other than receiving an incoming or outgoing message such as in response to selecting a user from the phone book.

In one embodiment, displaying 740 comprises a thread icon in an interface having other types of text and associated icons as shown in FIG. 1. In another embodiment, displaying 640 comprises an expanded thread of the outgoing and incoming messages as shown in FIG. 2.

The electronic communication device sends 950 the outgoing message as shown below in FIG. 16 and stores the message in the SMS message database 410.

Figure 10:
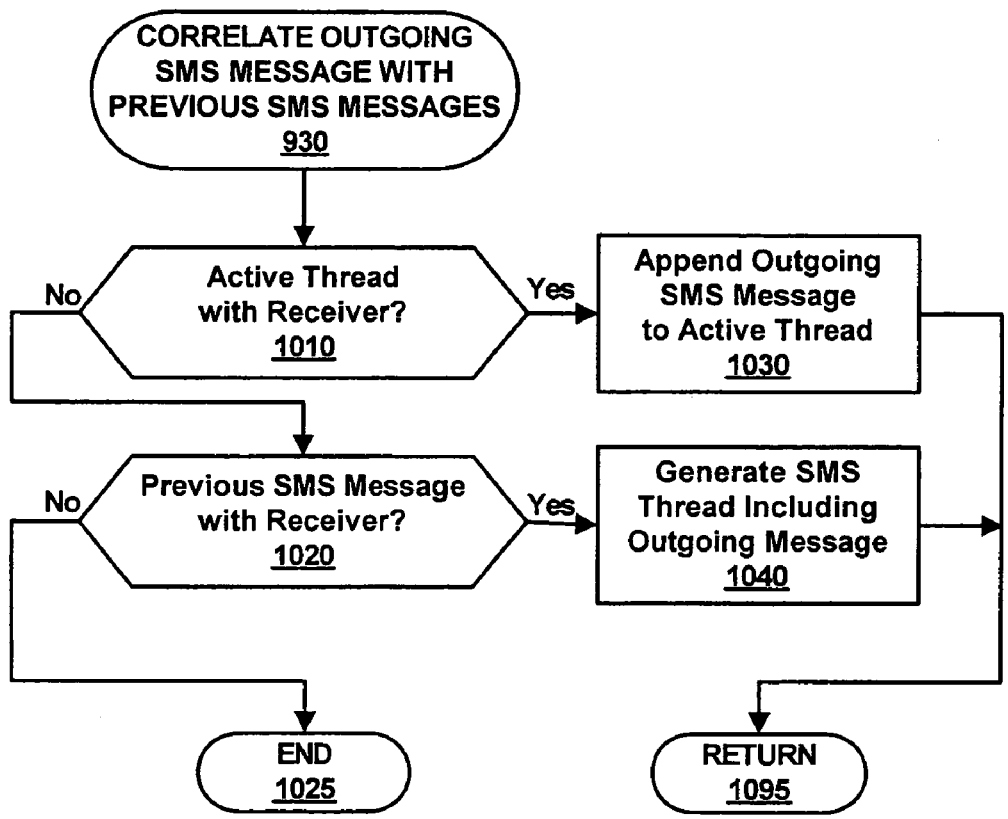
FIG. 10 is a flow chart illustrating the method of correlating an outgoing message with an SMS thread according to one embodiment of the present invention.

FIG. 10 is a flow chart illustrating the method of correlating 930 an outgoing message with an SMS thread according to one embodiment of the present invention. The threading engine 430 determines 1010 whether there is an active thread with the outgoing message's receiver. In doing so, the threading engine 430 checks the list of active threads 800 for matches with the receiver. If there is an active thread, the threading engine 430 appends 1030 the outgoing SMS message and related to the active thread.

If there is no an active thread, the threading engine 430 determines 1020 whether there are previous SMS messages sent to or received from the receiver. Accordingly, the threading engine 430 checks the SMS message database 254 to identify previous messages based on either the first or second identifier. If there are previous messages, the threading engine 430 generates 1040 an SMS thread including the outgoing message and related messages as shown in FIG. 11. If there are no previous messages, the process ends 1025.

Figure 11:
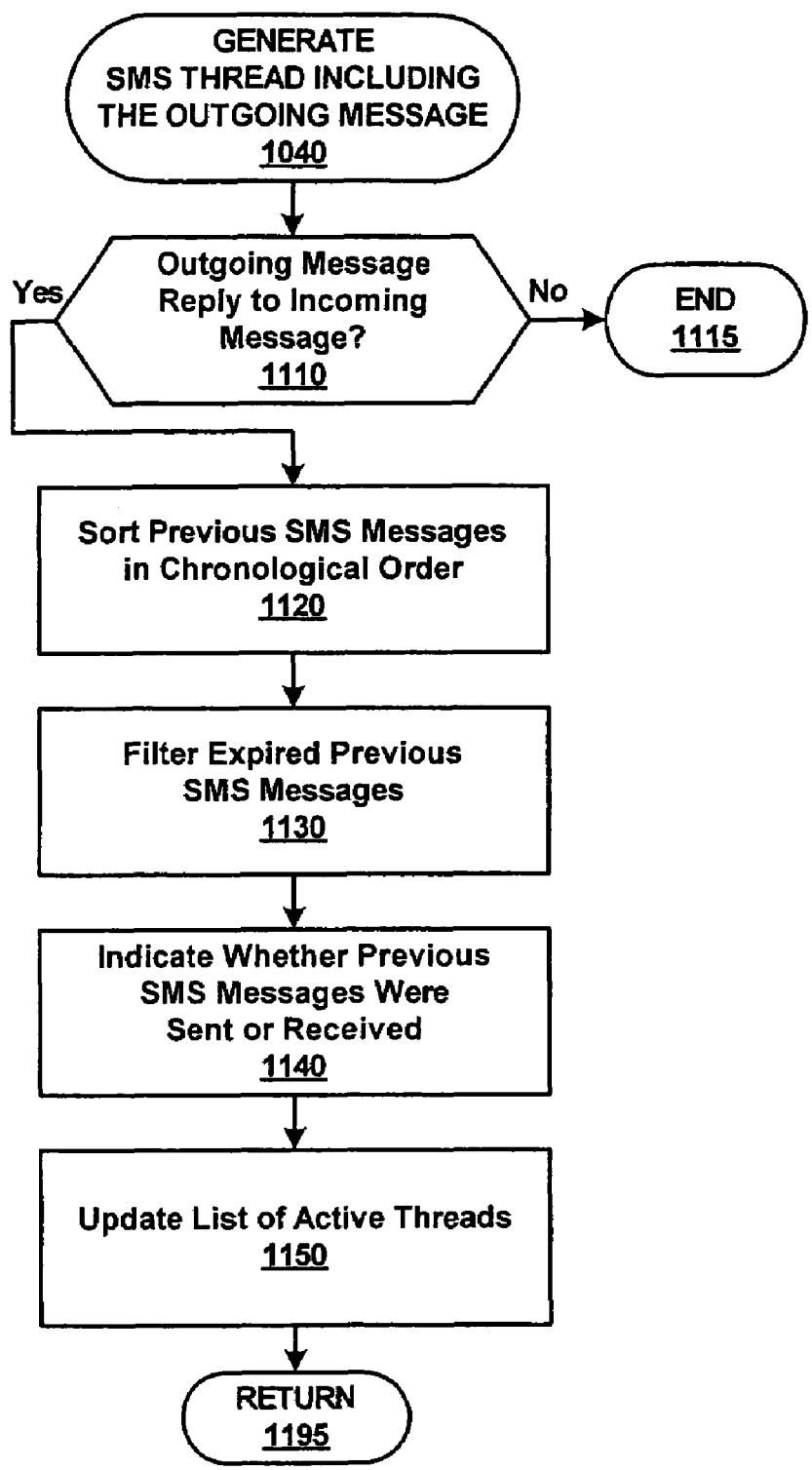
FIG. 11 is a flow chart illustrating the method of generating an SMS thread to include the outgoing message according to one embodiment of the present invention.

FIG. 11 is a flow chart illustrating the method of generating 1040 an SMS thread to include the outgoing message according to one embodiment of the present invention. In one embodiment, the threading engine 430 performs these tasks by implementing threading rules from the outgoing SMS message rules 510. It will be understood by one of ordinary skill in the art that the following threading rules are not comprehensive, but merely illustrative, and that other threading rules are within the scope of the present invention.

The threading engine 430 determines 1110 whether the outgoing message is a reply message to an incoming message. If so, the threading engine 430 continues by sorting 1120 the previous SMS messages in chronological order. In one embodiment, order of arrival to the electronic communication device determines the chronological order. In another embodiment, a time stamp at dispatch from an SMSC or sending electronic communication device determines the chronological order. In one embodiment, if the outgoing message is not a reply message, the process ends 1115.

The threading engine 430 filters 1130 expired SMS messages so that they are not included in the thread. Message expiration is determined by age, how many intervening messages have been received, or otherwise. In one embodiment, the threading engine 430 indicates 1140 whether previous SMS messages were sent or received so that the SMS application 440 can use different display formats in it's user interface. In one embodiment, the threading engine 430 updates 1150 the list of active threads 800 for faster processing of future messages.

Figure 12:
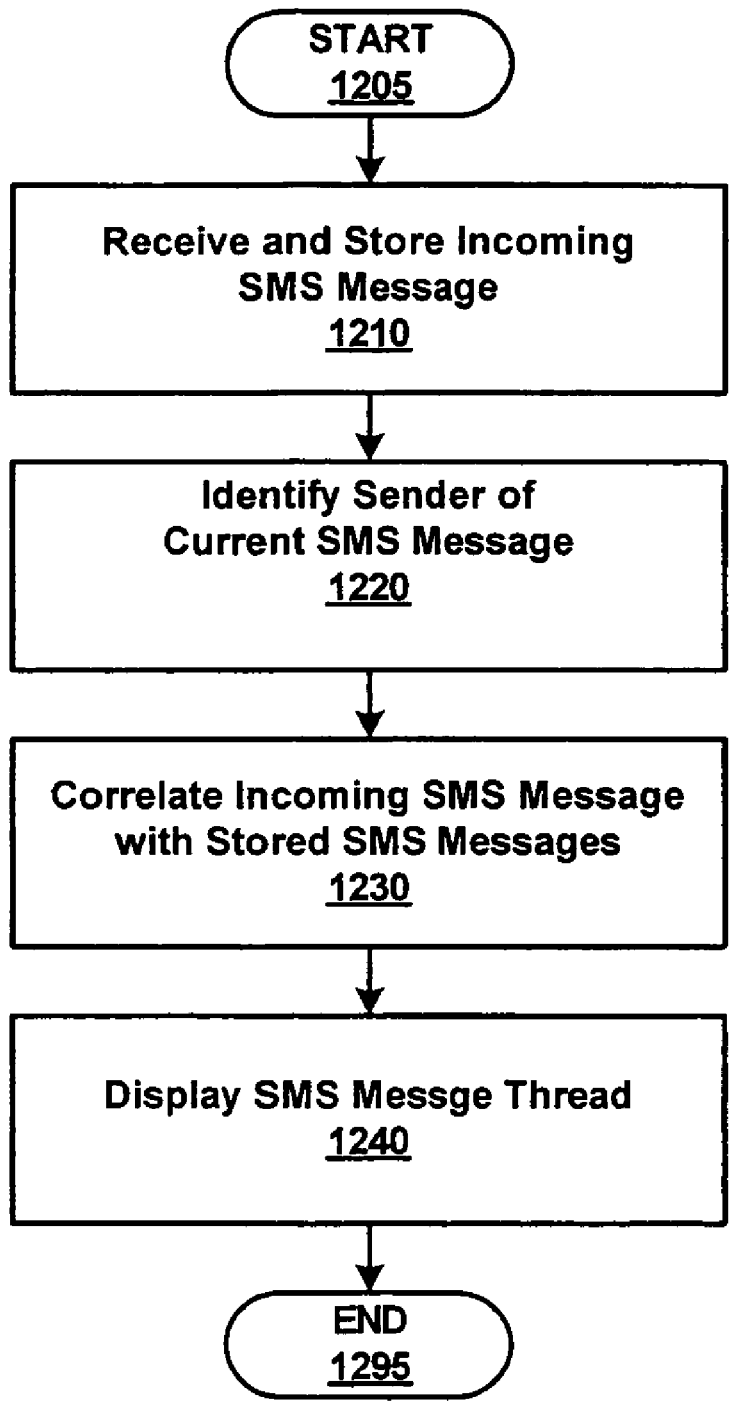
FIG. 12 is a flow chart illustrating the method of SMS threading to include an incoming message according to one embodiment of the present invention.

FIG. 12 is a flow chart illustrating the method of SMS threading 1200 to include an incoming message according to one embodiment of the present invention. The threading module 440 in this case initializes 1205 in response to the SMS database receiving an incoming message such as shown in FIG. 16.

The threading module 400 identifies 1320 the sender of the incoming message from a source address 810 in the SMS packet or as indicated by the SMS message database 410. As with an outgoing message, identifying 1320 may be based on a unique first or second identifier.

The threading engine 430 correlates 1230 the incoming message with previous messages according to incoming SMS message rules and outputs the resulting thread to the SMS application 440. An advantage of having separate incoming and outgoing rule sets is that the incoming rule set can be configured to contain more restrictions than outgoing threading to prevent unnecessary and unsolicited message threads. The SMS application 440 displays 1240 the SMS thread to the user as described above.

Figure 13:
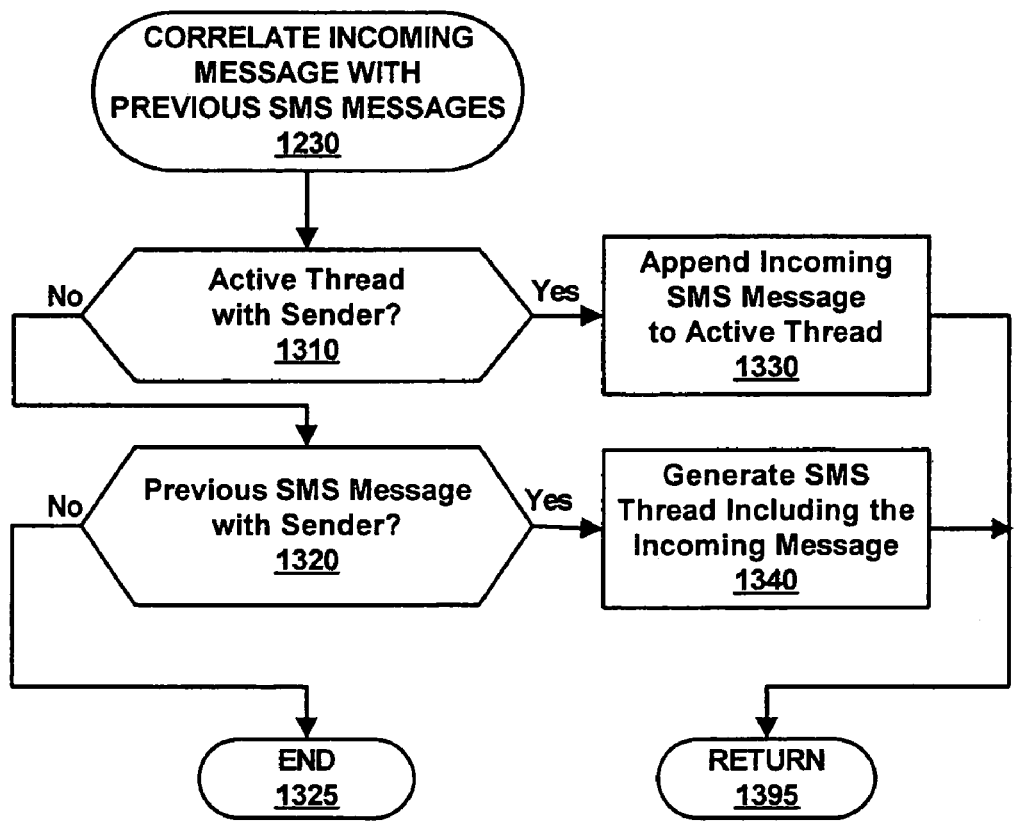
FIG. 13 is a flow chart illustrating the method of correlating an incoming message with an SMS thread according to one embodiment of the present invention.

FIG. 13 is a flow chart illustrating the method of correlating 1230 an incoming message with an SMS thread according to one embodiment of the present invention. The threading engine 430 determines 1310 whether there is an active thread with the outgoing message's receiver by checking the list of active threads 800. If there is an active thread, the threading engine 430 appends 130 the incoming SMS message to the active thread.

If there is no an active thread, the threading engine 430 determines 1320 whether there are previous SMS messages with the sender. Accordingly, the threading engine 430 checks the SMS message database 410 to identify previous messages based on either the first or second identifier. If there are previous messages, the threading engine 430 generates 1340 an SMS thread including the incoming message and related messages as described. If there are no previous messages with the sender, the process ends 1325

Figure 14:
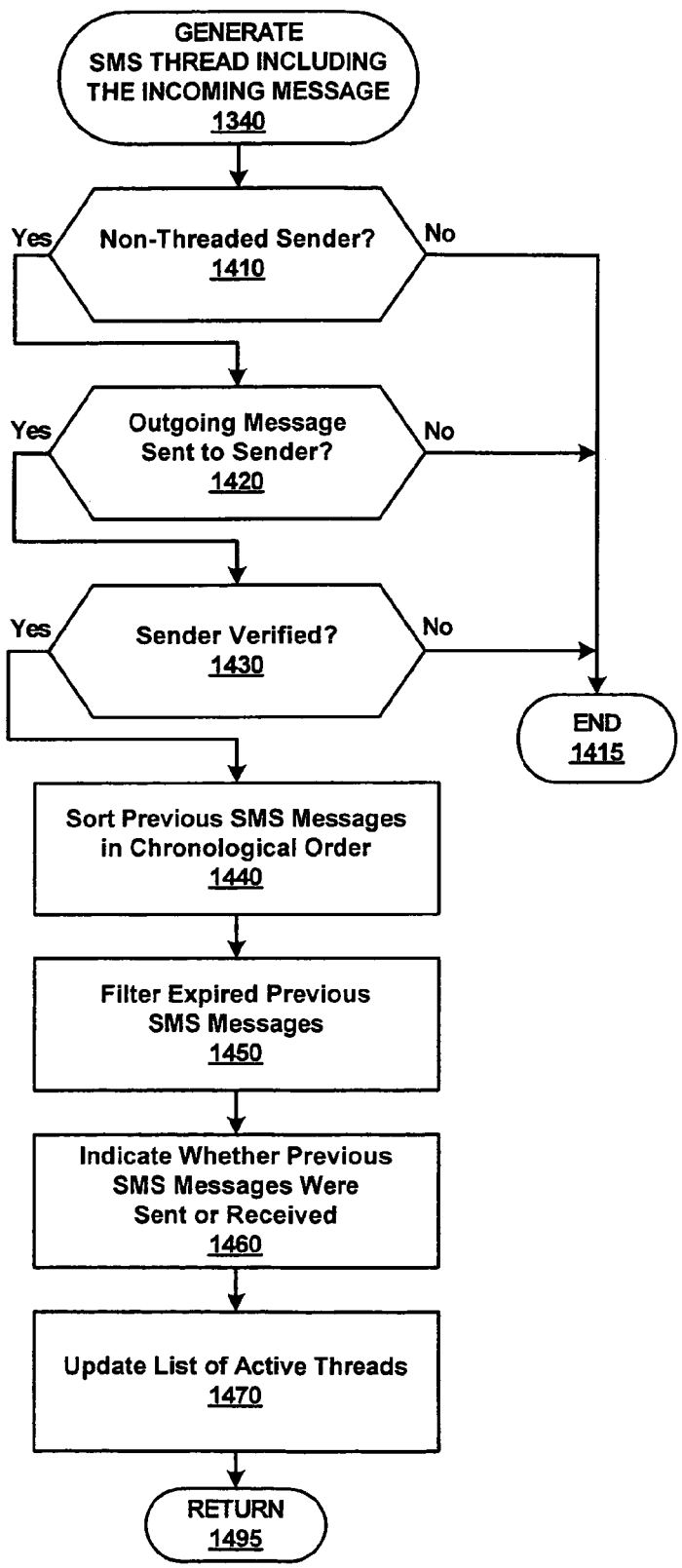
FIG. 14 is a flow chart illustrating the method of generating an SMS thread to include the incoming message according to one embodiment of the present invention.

FIG. 14 is a flow chart illustrating the method of generating 1340 an SMS thread to include the incoming message according to one embodiment of the present invention. In one embodiment, the threading engine 430 performs these tasks by implementing the threading rules from the incoming SMS message rules 520. Again, the present rule set is for illustrative purposes only.

In one embodiment, the threading engine 430 determines 1510 whether the sender is a non-threaded sender. If the sender is a non-threaded sender, the process ends 1415. If the sender is not a non-threaded sender, the threading engine 430 determines 1420 whether a previous outgoing message was sent to the sender. If a previous outgoing message was not sent to the sender, the process ends 1415.

If a message was sent to the sender, the threading engine 430 sorts 1440 the previous SMS messages in chronological order as described. In one embodiment, the threading engine 430 then filters 1450 expired SMS messages and updates 1470 the list of active threads 800.

FIG. 15A is a block diagram illustrating an example electronic communication 1500 device according to one embodiment of the present invention. The electronic communication device 1500, such as a GSM or CDMA cell phone, comprises a transceiver 1510, a SIM (Subscriber Identity Module) card 1520, a processor 1530, an input/output controller 1550, and a memory 1540 each coupled in communication with a conventional bus 1599.

The transceiver 1510 provides the transmission and reception of signals carrying SMS messages in SMS data packets 600 through a carrier frequency. The transceiver 1510 may be an RF (Radio Frequency), a Bluetooth, an IEEE 802.11-type, a USB (Universal Serial Bus) or an IEEE 1394-type transceiver, or any other transceiver capable of transmitting and receiving signals carrying SMS messages.

The SIM card 1520 provides user account information to log on to a carrier server. Responsive to an event such as power-up or reset, the SIM card 1520 securely provides user profile information for access to the carrier server. The SIM card 1520 may be a compact flash or other type of memory capable of storing a user profile.

The processor 1530 executes instructions and manipulates data necessary for SMS message threading. The processor 1530 may be a microprocessor such as an ARM processor by ARM, Inc., a Pentium 4® by Intel Corp. or an Athlon XP® by Advanced Micro Devices, an ASIC, a FPD (Field Programmable Device), a microcontroller, or any other device capable of executing instructions and manipulating data. In an embodiment, the processor 1530, comprises a host processor 1532 and a radio processor 1534. The host processor 1532 then executes instructions and manipulates data while the radio processor 1534 communicates with transceiver 1510. Thus, the host processor 1532 can enter into a powered-down, or "sleep," mode to conserve power while the radio processor 1534 continues to operate, allowing transmission and receipt of signals carrying SMS messages in SMS data packets 600.

Figure 15B:
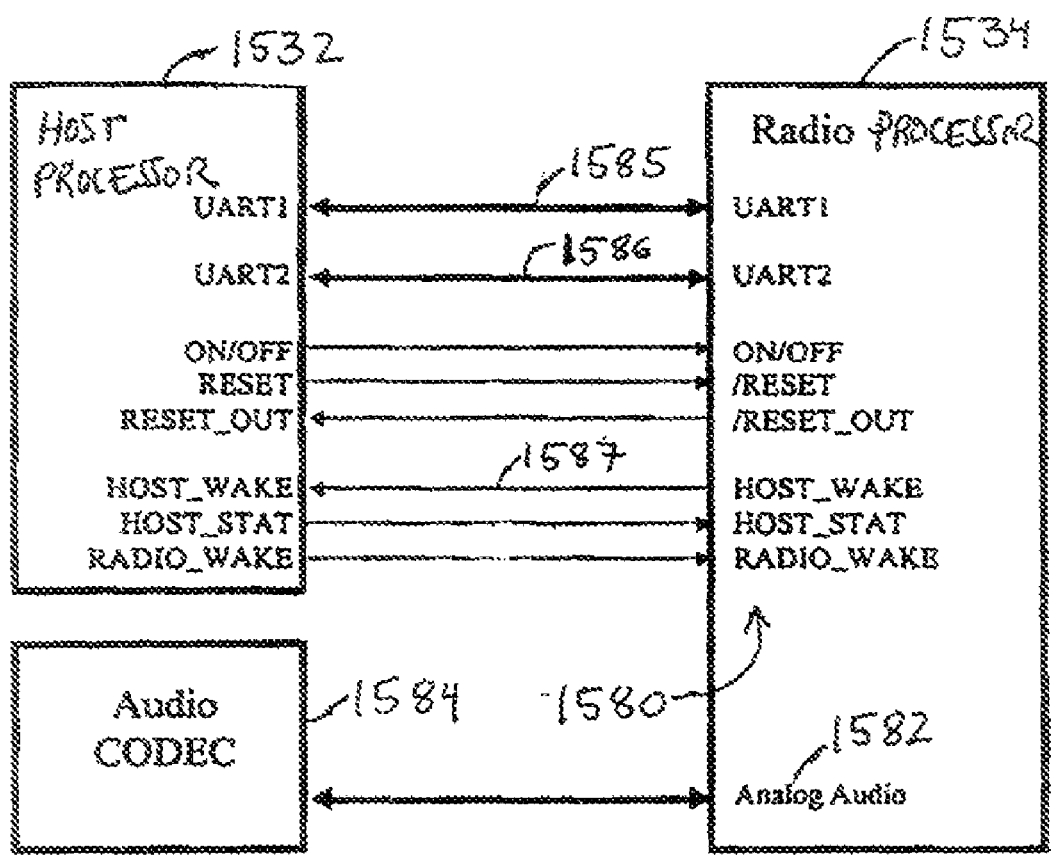
FIG. 15B is a block diagram illustrating an example design of the processor to limit power consumption according to one embodiment of the present invention.

Referring now to FIG. 15B, an exemplary design of the processor 1530 to limiting power consumption will be described. FIG. 15B is a schematic diagram illustrating communication lines between a plurality of processors, the host processor 1532 and the radio processor 1534, according to an exemplary embodiment. As can be seen, a plurality of digital serial ports and control signals 1580 of radio processor 1534 are coupled to host processor 1532. Analog audio signals 1582 are coupled to audio CODEC 1584 for routing to microphones, speakers, or host processor 1532. In one exemplary embodiment, UART1 1585 may be used for multiplexed control and data. UART2 1586 may be used for debug information during development. In an alternative embodiment, UART1 1585 may be used for command and diagnostics information and UART2 1586 may be used for data calls.

In the system of FIG. 5, a plurality of signals are used to control power management functions between host processor 1532 and radio processor 1534.

RESET/ON-OFF (ON/OFF, RADIO_RESET~, RESET_OUT~)

ON/OFF—This active high input signal turns radio processor 1534 on and off. A high level on this pin will turn on radio processor 1534 and boot host processor 1532. A low level on this pin will force radio processor 1534 off immediately, rather than into a graceful shutdown. The graceful shutdown will be accomplished via a software command before the ON/OFF pin is driven low.

RADIO_RESET~—The active low input pin is the master reset for radio processor 1534. This pin will need to be driven low and then high in order to accomplish a full radio reset.

RESET_OUT~—This signal is an output from a CDMA radio processor 1534, and indicates that CDMA radio processor 1534 is in RESET and requires initialization.

HANDSHAKE (HOST_WAKE, RADIO_WAKE, HOST_STATUS)

HOST_WAKE—Radio processor 1534 drives this active high signal to host processor 1532 when it wants to wake up host processor 1532 to send a message. In addition, when host processor 1532 wakes up radio processor 1534 this signal is used to acknowledge the RADIO_WAKE signal from host processor 1532. This signal should remain high as long as messages are pending from radio processor 1534 or as long as host processor 1532 has requested radio processor 1534 to be turned on.

RADIO_WAKE—Host processor 1532 drives this active high signal to radio processor 1534 when it wants to wake up radio processor 1534 to send a message. In addition, when radio processor 1534 wakes up host processor 1532 this signal is used to acknowledge the HOST_WAKE signal from radio processor 1534. This signal should remain high as long as messages are pending from host processor 1532 or as long as radio processor 1534 has requested host processor 1532 to be turned on.

HOST_STATUS—This signal is used to inform radio processor 1534 of the sleep status of host processor 1532. When this signal is low, host processor 1532 is asleep, and radio processor 1534 should not send low-priority messages. When the signal is high, host processor 1532 is awake, and radio processor 1534 is free to send message of any priority to host processor 1532.

POWER SUPPLY (VCC_RADIO, VCC_BB, BVATT, GROUND)

VCC_RADIO—This signal is provided by radio processor 1534 and is connected to the I/O voltage of the baseband IC. It will be used by the Duo board to determine when the baseband chip has been powered up and to supply voltage to any interface circuitry, if required.

VCC_BB—This is a power input to radio processor 1534 to be used to derive the various baseband voltages. Rather than use a higher voltage VBATT, this input is a lower voltage (3.2 V typically) to allow for better power efficiency.

VBATT—This is main battery voltage of the system, ranging from approximately 3.4 to 4.2 volts.

GROUND—This is the main ground connection in the system. 4 pins are used for power return, and 2 are used for signal ground.

Handshaking functions can be provided in any of a variety of methods. Exemplary methods are set forth below:

Power On—GSM

1. User powers on device 10.
2. VDDS_OUT is asserted. Host processor 1532 cannot assert MODULE_WAKE until VDSS_OUT is high, in this exemplary embodiment.
3. Radio processor 1534 will come out of reset about 5 ms after VDDS_OUT is high. Radio processor 1534 will then drive HOST_WAKE after initialization is complete and it sees MODULE_WAKE.
4. Radio processor 1534 sends message to host processor 1532 ($1^{st}$ message sent by the modem) to indicate that radio processor 1534 is powered up.

Power On—CDMA

1. User powers on the module.
2. VDDS_OUT is asserted. Host processor 1532 cannot assert MODULE_WAKE until VDDS_OUT is high, in this exemplary embodiment.
3. Radio processor 1534 will come out of reset about 5 ms after VDDS_OUT is high. Radio processor 1534 will then drive HOST_WAKE after initialization is complete and it sees MODULE_WAKE.
4. Host processor 1532 sends Enable_Autonomous_Messaging message to radio processor 1534 ($1^{st}$ message sent by host processor 1532). This message enables radio processor 1534 to send autonomous messages to host processor 1532, and also acts as a soft handshake to signal to radio processor 1534 that host acknowledges that modem is powered up.
5. Radio processor 1534 de-asserts RESET_OUT after receiving the message.

Power Off

1. User powers down the module.
2. CPU sends graceful deregistration commands to radio processor 1534 and waits for confirmation response.
3. CPU de-asserts ON/OFF which immediately shuts off power to radio processor 1534.

Host Sleep/Wake Status

The CDMA radio processor 1534 needs to know host processor's 1532 sleep mode status to suppress low priority messages (GSM radio module does not). This is important to conserve host's power by shutting down the UARTs. When host goes to sleep, it will de-assert the HOST_STATUS signal which will result in an interrupt to radio processor 1534. Modem will suppress all low priority control messages until this signal is asserted.

Host sends data to Modem

1. Host asserts MODULE_WAKE interrupt to signal to radio processor 1534 that it wishes to initiate data transfer. Host UART is already enabled at this point.
2. Modem woke up if it was in sleep mode. TCXO, UART1 and UART2 are enabled. Modem is ready to receive data. It asserts HOST_WAKE interrupt to signal to host processor 1532 that it's ready to receive data.
3. Message transfer occurs. Multiple messages can be exchanged.
4. After the message has terminated there is a short hysteresis period to prevent unnecessary toggling of either of the handshake signals.
5. Host de-asserts MODULE_WAKE interrupt since it has finished all the message transfer at this point. Modem however can still send messages to host processor 1532. Modem will NOT sleep until MODULE_WAKE is de-asserted so host processor 1532 de-asserts MODULE_WAKE when it is finished with its transmission.
6. Modem de-asserts HOST_WAKE interrupt if it also does not have any other messages to send. Note: The initiator (host in this case) does not have to terminate the communication first. Now since both MODULE_WAKE and HOST_WAKE are de-asserted, the communication channel is closed and UART clocks are disabled.
7. Both processors can enter into sleep state.

Modem sends data to Host

1. Modem asserts HOST_WAKE interrupt to signal to host processor 1532 that it wishes to initiate data transfer. Modem UARTs are already enabled at this point.
2. Host wakes up if it was in sleep mode. Host's UARTs are enabled. Host is ready to receive data on the UARTs. Host asserts MODULE_WAKE to signal to radio processor 1534 that it's ready to receive data.
3. Message transfer occurs. Multiple bi-directional messages can be exchanged.
4. After the message is terminated there is a short hysteresis period to prevent unnecessary toggling of either of the handshake signals.
5. Modem de-asserts HOST_WAKE interrupt since it has finished all the message transfer at this point. Host can still send messages.
6. Host de-asserts MODULE_WAKE interrupt since it's done with message transfer. The communication channel is closed.
7. Both processors can enter into sleep state.

Thus, in one embodiment the processor 1530 can be configured to conserve power use by allowing the host processor 1532 to enter a reduced power mode when data signals are not being processed, upon receiving a data signal to be processed, the radio processor 1534 can then wake the host processor 1532. Alternatively the radio processor 1534 can enter a reduced power mode when there are no data signals being transmitted or received, the host processor 1532 can then wake the radio processor 1534 when a data signal is ready for transmission.

The input/output controller 1550 receives outgoing messages from and sends thread display information. The input/output controller 1550 may further comprise an audio/video interface, interface drivers, a set of input and/or output buffers, and/or microcode for interrupts. The input/output controller 1550 may be implemented in hardware, software, or a combination. The input/output controller 1550 is also capable of servicing other input/output or peripheral devices.

The input/output controller 1550 is coupled to a display 1560. The display 1560 receives and displays processed video from the input/output controller 1550. The display 1560 is, for example, a monitor, such as an LCD or plasma type, a television, or any other type of display device capable of displaying message-threads. The display 1560 may be integrated with the device 110 or separate.

The input/output controller 1550 is also coupled to a keypad 1570. The keypad 1570 receives messages and control commands from the user and outputs to the input/output controller 270. The keypad 1570 is, for example, a 'QWERTY' keyboard, a number pad, a graffiti module, a touch screen, a combination or any other input device capable of receiving user text and commands. The 'QWERTY' keyboard may be mechanically adapted to use on a mobile device. Additionally, they keypad 1570 works in combination with software that provides text shortcuts for faster text entry.

The memory 1540 stores the program code executed by the processor to thread messages such as the threading module 1542. The memory 1540 may be a non-volatile type persistent memory such as a hard disk, a compact flash, or an EEPROM. The memory 1540 may be also be a volatile type such as a random access memory, a buffer, a cache, a register, a combination of non-volatile and volatile memory, or other device capable of storing instructions and data. The memory 1540 may also be a single storage device or a system of storage devices. In one embodiment, the memory 1540 also includes a phone book to store user contacts, phone numbers, SMS addresses, e-mail addresses, etc.

FIG. 16 is a block diagram illustrating an example system 1600 for transmitting SMS messages. The system 1600 comprises electronic communication devices 1610*a-d* coupled to an SMS network 1655.

The electronic communication devices 1610 correlate messages into threads for display to a user. The electronic communication devices 1610 exchange messages with each other through the SMS network 1655. The electronic communication devices 1610 provide the described user interface to display messages to the user and also to input new messages. The electronic communication devices 1610 may comprise a PDA (Personal Desktop Assistant) such as the Palm Pilot, an IP or cellular telephone, a hybrid PDA/cellular telephone device such as the Treo 600 by Handspring, a PC (Personal Computer), a network appliance, a mobile network device, an SMS device or any other device capable of sending and receiving messages with the SMS network 1655.

The SMS network 1655 comprises various interconnected network devices providing communication pathways for SMS messages exchanged between SMS devices 1610. In one embodiment, the SMS network 1655 comprises SMSCs that forward SMS packets 800 from the electronic communication devices 1610 to other components within the SMS network 1655 and other electronic communication devices 1610. In another embodiment, the SMS network 1655 comprises a gateway to interface with alternative networks and an alternative network such as those on an IP network. An electronic communication device 1610 such as a PDA can thus exchange SMS messages with a PC. In another embodiment, the system 1600 comprises an MMS or other type of messaging network for which the electronic communication devices 1600 thread messages.

In sum, a system and method provide message threading for stored SMS messages. The threading engine 430 identifies relationships between SMS messages by applying a set of threading rules responsive to an electronic communication device sending or receiving an SMS or other type of message.

The above description is included to illustrate the operation of the preferred embodiments and is not meant to limit the scope of the invention. The scope of the invention is to be limited only by the following claims. From the above discussion, many variations will be apparent to one of ordinary skill in the art that would yet be encompassed by the spirit and scope of the invention.

We claim:

1. A method for displaying a plurality of related SMS (Short Message Service) messages comprising:
    reviewing a plurality of SMS messages associated with a first party;
    determining whether to thread one or more SMS messages from the plurality of SMS messages into an SMS message thread by applying a set of incoming SMS message rules to incoming SMS messages, the set of incoming SMS message rules associating an incoming SMS message from a first telephone number and an incoming SMS message from a second telephone number with the SMS message thread which includes one or more SMS messages from a contact associated with the first telephone number and with the second telephone number, and applying a set of outgoing SMS message rules to outgoing SMS messages, the set of outgoing SMS message rules associating an outgoing SMS message with one or more threads including one or more SMS messages, wherein the outgoing SMS message rules are different from the incoming SMS message rules and the one or more SMS messages are also associated with a second party; and
    outputting the SMS message thread displaying a relationship between two or more SMS messages.

2. The method of claim 1, wherein at least one of the SMS messages associated with the second party comprises a reply message.

3. The method of claim 1, wherein at least one of the SMS messages associated with the second party comprises a message other than a reply message.

4. The method of claim 1, wherein the determining whether to thread further comprises:
    searching the one or more SMS messages based on a first identifier associated with the second party.

5. The method of claim 4, wherein the first identifier comprises a telephone number.

6. The method of claim 4, wherein the first identifier comprises one from the group of a telephone number and an SMS address.

7. The method of claim 4, further comprising:
    storing the plurality of SMS messages associated with the first party in a persistent storage device.

8. The method of claim 1, wherein the first party is a sender of one of the second party SMS messages and the second party is the receiver.

9. The method of claim 1, wherein the first party is a receiver of one of the second party SMS messages and the second party is the sender.

10. The method of claim 1, further comprising:
    receiving a current SMS message from the second party; and
    determining whether to thread the current message into the SMS message thread.

11. The method of claim 1, wherein the set of incoming SMS message rules or the set of outgoing SMS message rules includes a rule to prevent threading if the second party is a non-threaded party.

12. The method of claim 11, wherein the non-threaded party comprises a broadcasting party.

13. The method of claim 1, wherein the set of incoming SMS message rules or the set of outgoing SMS message rules includes a rule to verify the second party as a threaded party.

14. The method of claim 13, wherein the verification rule verifies the second party if the second party matches an entry in a phone book.

15. The method of claim 1, wherein the correlating further comprises:
    applying a set of SMS message rules to define thread characteristics, wherein the set of SMS message rules comprises a rule to prevent expired SMS messages from being threaded.

16. The method of claim 1, wherein the correlating further comprises:
    applying a set of SMS message rules to define thread characteristics, wherein the set of SMS message rules including a rule to define the order in which SMS messages are threaded.

17. The method of claim 1, wherein the outputting the SMS message thread comprises:
    outputting the SMS message thread to an SMS application for display in a threaded format.

18. The method of claim 17, further comprising:
    displaying an icon in the SMS application to represent an SMS message thread.

19. The method of claim 17, wherein the SMS application is a network browser.

20. The method of claim 17, wherein outputting further comprises:
formatting messages originated by the first party in a first display format; and
formatting messages originated by the second party in a second display format.

21. The method of claim 1, further comprising:
displaying the SMS messages.

22. The method of claim 1, further comprising receiving and threading at least one MMS message.

23. The method of claim 1, further comprising receiving and threading at least one EMS message.

24. The method of claim 1, further comprising receiving and threading at least one message using a data protocol capable of encapsulating messages for transport between networked devices.

25. The method of claim 1, wherein determining whether to thread is performed without user input.

26. The method of claim 1, wherein determining whether to thread is performed in accordance with one or more threading rules.

27. The method of claim 1, wherein outputting the SMS message thread comprises:
displaying the SMS message thread on a screen of a mobile telephony device.

28. A device for displaying a plurality of related SMS (Short Message Service) messages, comprising:
a SMS message database to store a plurality of SMS messages associated with a first party;
a threading module, coupled in communication with the SMS message database, the threading module determining whether to thread one or more SMS messages from the plurality of SMS messages into an SMS message thread, the one or more SMS messages associated with a second party, and to output the SMS message thread; and
a threading rule database including a set of incoming SMS message rules applicable to incoming SMS messages, the set of incoming SMS message rules associating an incoming SMS message from a first telephone number and an incoming SMS message from a second telephone number with a thread which includes one or more SMS messages associated with a contact associated with the first telephone number and with the second telephone number, and a set of outgoing SMS message rules applicable to outgoing SMS messages, the set of outgoing SMS message rules associating an outgoing SMS message with one or more threads including one or more SMS messages, wherein the set of outgoing SMS message rules are different from the set of incoming SMS message rules.

29. The device of claim 28, wherein one of the second party SMS messages comprises a reply message.

30. The device of claim 28, wherein one of the second party SMS messages comprises a message other than a reply message.

31. The device of claim 28, wherein the threading module searches an SMS message database based on a first identifier associated with the second party.

32. The device of claim 31, wherein the first identifier comprises a telephone number.

33. The device of claim 31, wherein the first identifier comprises an SMS address.

34. The device of claim 31, wherein the threading module retrieves a second identification for the second party, wherein the SMS message thread comprises SMS messages associated with both the first and second identifications.

35. The device of claim 28, wherein the first party is a sender of one of the second party SMS messages and the second party is the receiver.

36. The device of claim 28, wherein the first party is a receiver of one of the second party SMS messages and the second party is the sender.

37. The device of claim 28, wherein the threading module receives a current SMS message from the second party, and determines whether to thread the current message into the SMS message thread.

38. The device of claim 28, wherein the threading module further comprises a threading engine to apply the set of incoming SMS message rules to incoming SMS messages and the set of outgoing SMS message rules to outgoing SMS messages.

39. The device of claim 28, wherein the set of incoming SMS message rules define thread characteristics, the set of incoming SMS message rules including a rule to prevent threading if the second party is a non-threaded party.

40. The device of claim 37, wherein the threading module further comprises a threading engine to apply the set of incoming SMS message rules to define thread characteristics, wherein the set of incoming SMS message rules including a rule to verify the second party as a threaded party.

41. The device of claim 38, wherein the verification rule verifies the second party if the second party matches an entry in a phone book.

42. The device of claim 28, wherein the set of incoming SMS message rules or the set of outgoing SMS message rules includes a rule to prevent expired SMS messages from being threaded.

43. The device of claim 28, wherein the set of incoming SMS message rules or the set of outgoing SMS message rules includes a rule to define the order in which SMS messages are threaded.

44. The device of claim 28, wherein the threading module outputs the SMS message thread to an SMS application for display in a threaded format.

45. The device of claim 44, further comprising:
the SMS application to display an icon to represent a threaded SMS.

46. The device of claim 28, further comprising:
a PDA (Personal Digital Assistant) to display the SMS messages.

47. The device of claim 28, further comprising:
a messaging device to display the SMS messages.

48. The device of claim 28, further comprising:
a mobile device to display the SMS messages.

49. The device of claim 28, further comprising receiving and threading at least one MMS message.

50. The device of claim 28, further comprising receiving and threading at least one EMS message.

51. The device of claim 28, further comprising receiving and threading at least one message using a data protocol capable of encapsulating messages for transport between networked devices.

52. The device of claim 28, wherein determining whether to thread is performed without user input.

53. A computer product, comprising:
a computer-readable medium having computer program instructions and data embodied thereon for displaying a plurality of related SMS (short message service), comprising:
reviewing a plurality of SMS messages associated with a first party;

determining whether to thread one or more SMS messages from the plurality of SMS messages into an SMS message thread by applying a set of incoming SMS message rules to incoming SMS message, the set of incoming SMS message rules associating an incoming SMS message from a first telephone number and an incoming SMS message from a second telephone number with the SMS message thread which includes one or more SMS messages associated with a contact associated with the first telephone number and with the second telephone number, and applying a set of outgoing SMS message rules to outgoing SMS messages, the set of outgoing SMS message rules associating an outgoing SMS message with one or more threads including one or more SMS messages, wherein the outgoing SMS message rules are different from the incoming SMS message rules and the one or more SMS messages are associated with a second party; and outputting the SMS message thread.

54. The computer product of claim 53, wherein at least one of the SMS messages associated with the second party comprises a reply message that has yet to be transmitted.

55. The computer product of claim 53, wherein at least one of the SMS messages associated with the second party comprises a message other than a reply message.

56. The computer product of claim 53, wherein the identifying comprises:
searching the one or more SMS messages based on a first identifier associated with the second party.

57. The computer product of claim 56, wherein the first identifier comprises a telephone number.

58. The computer product of claim 56, wherein the first identifier comprises an SMS address.

59. The computer product of claim 53, further comprising:
retrieving a second identification for the second party,
wherein the SMS message thread comprises SMS messages associated with both the first and second identifications.

60. The computer product of claim 53, wherein the incoming SMS message rules or the outgoing SMS message rules include a rule to prevent threading if the second party is a non-threaded party.

61. The computer product of claim 53, wherein
the incoming SMS message rules or the outgoing SMS message rules include a rule to verify the second party as a threaded party.

62. The computer product of claim 61, wherein the verification rule verifies the second party if the second party's unique identification matches an entry in a phone book.

63. The computer product of claim 53, wherein the determining whether to thread further comprises:
applying a set of SMS message rules to define thread characteristics, wherein the incoming SMS message rules or the outgoing SMS message rules include a rule to prevent expired SMS messages from being threaded.

64. The computer product of claim 53, wherein the determining whether to thread further comprises:
applying a set of SMS message rules to define thread characteristics, wherein the incoming SMS message rules or the outgoing SMS message rules include a rule to define the order in which SMS messages are threaded.

65. The computer product of claim 53, wherein the outputting the SMS message thread comprises:
outputting the SMS message thread to an SMS application for display in a threaded format.

66. The computer product of claim 65, further comprising:
displaying an icon in the SMS application to represent a threaded SMS.

67. The computer program product of claim 53, further comprising receiving and threading at least one MMS message.

68. The computer program product of claim 53, further comprising receiving and threading at least one EMS message.

69. The computer program product of claim 53, further comprising receiving and threading at least one message using a data protocol capable of encapsulating messages for transport between networked devices.

70. The computer program product of claim 53, wherein determining whether to thread is performed without user input.

71. The computer program product of claim 53, wherein outputting the SMS message thread comprises:
displaying the SMS message thread on a screen of a mobile telephony device.

72. A method for displaying a plurality of related messages on a handheld device, comprising:
reviewing a plurality of messages received by the handheld device and associated with a first party;
determining whether to thread one or more messages from the plurality of messages into an message thread by applying a set of incoming SMS message rules to incoming SMS message, the set of incoming SMS message rules associating an incoming SMS message from a first telephone number and an incoming SMS message from a second telephone number with the message thread which includes one or more SMS messages associated with a contact associated with the first telephone number and with the second telephone number, and applying a set of outgoing SMS message rules to outgoing SMS messages, the set of outgoing SMS message rules associating an outgoing SMS message with one or more threads including one or more SMS messages, wherein the outgoing SMS message rules are different from the incoming SMS message rules and the one or more messages are also associated with a second party; and
outputting the message thread.

73. The method of claim 72, further comprising receiving and threading at least one MMS message.

74. The method of claim 72, further comprising receiving and threading at least one EMS message.

75. The method of claim 72, wherein determining whether to thread is performed without user input.

76. The method of claim 72, wherein outputting the message thread comprises:
displaying the message thread on a screen of a mobile telephony device.

* * * * *

UNITED STATES PATENT AND TRADEMARK OFFICE
CERTIFICATE OF CORRECTION

PATENT NO. : 7,620,407 B1  Page 1 of 1
APPLICATION NO. : 10/759597
DATED : November 17, 2009
INVENTOR(S) : Donald et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1358 days.

Signed and Sealed this

Twenty-sixth Day of October, 2010

David J. Kappos
*Director of the United States Patent and Trademark Office*